H. V. STYERS.
HOSE CONNECTION.
APPLICATION FILED JUNE 30, 1914.

1,194,793.

Patented Aug. 15, 1916.

Witnesses
R. J. Williams.
C. E. Chandlee.

Inventor
H. V. Styers,
By Chandlee & Chandlee
Attorneys

UNITED STATES PATENT OFFICE.

HAROLD V. STYERS, OF WARWICK, NEW YORK.

HOSE CONNECTION.

1,194,793.

Specification of Letters Patent.

Patented Aug. 15, 1916.

Application filed June 30, 1914. Serial No. 848,245.

*To all whom it may concern:*

Be it known that I, HAROLD V. STYERS, a citizen of the United States, residing at Warwick, in the county of Orange, State of New York, have invented certain new and useful Improvements in Hose Connections; and I do hereby declare the following to be a full, clear, and exact description of the invention, such as will enable others skilled in the art to which it appertains to make and use the same.

This invention relates to improvements in couplings particularly designed for use in connection with sections of hose or pipe through which fluids employed as motive agents, are adapted to be conveyed.

An object of the invention is to provide a coupling of this character which will embody in its construction the desired features of simplicity, efficiency and reliability and which may be manufactured at a relatively low cost.

With the above and other objects of similar nature in view, the invention consists in the construction, combination and arrangement of parts set forth in and falling within the scope of the appended claim.

Figure 1:
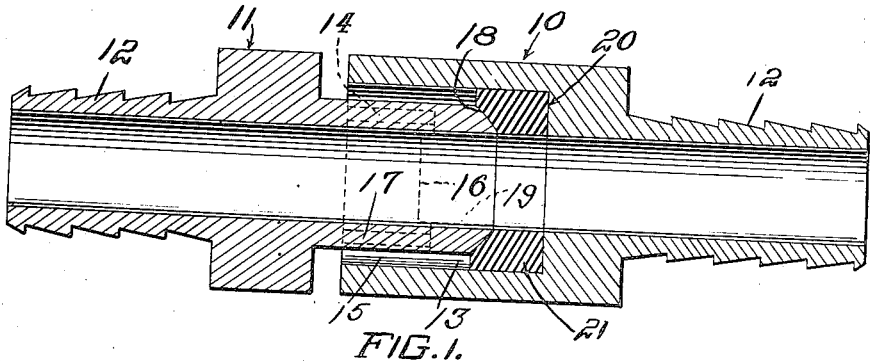
Figure 2:
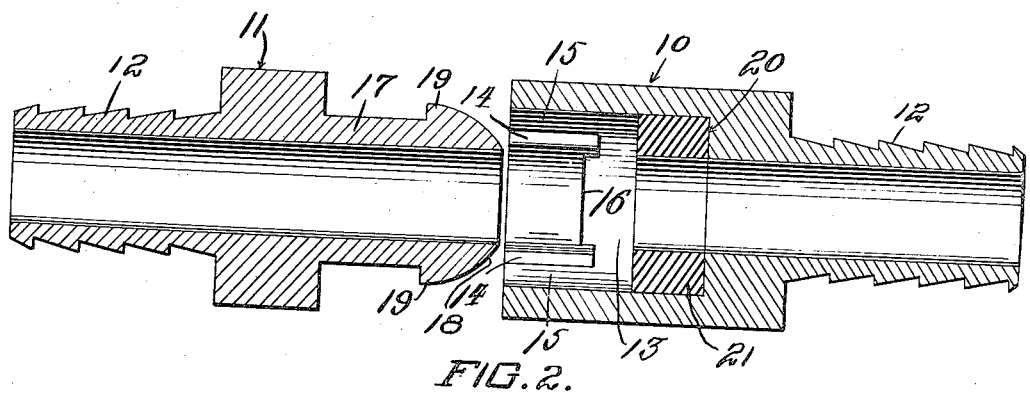
Figure 3:
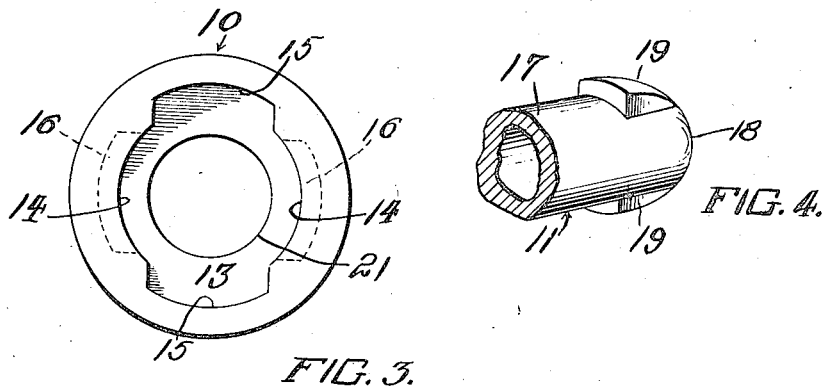
Figure 4:
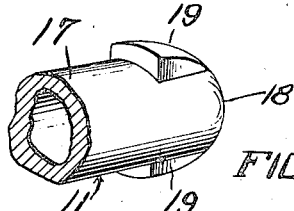

In the drawings: Figure 1 is a longitudinal sectional view through the improved coupling with the parts assembled, Fig. 2 is a similar view with the parts disassembled, Fig. 3 is an end view of one of the coupling members and Fig. 4 is a fragmentary perspective view of the other coupling member.

Referring now more particularly to the drawing, the coupling comprises essentially, the castings or tubular members 10 and 11 which are formed with the usual ribbed stems 12 whereby they may be connected to the sections of hose to be coupled or if desired they may be threaded to receive the threaded end of a valve or section of pipe. In detail, the member 10 is provided with a cylindrical socket 13 having formed therein circumferentially spaced ribs 14, said ribs providing between their mutually adjacent ends diametrically opposed channels 15, and having formed on their inner edges the notches 16. The member 11 is provided at one end with a cylindrical portion 17, the extremity of which is rounded as at 18, said portion being provided with diametrically opposed, longitudinally extending curved lugs 19 which gradually decrease in thickness toward the curved end thereof. Seated within the socket 13 and engaging the shoulder 20 is a gasket 21 which is formed preferably of live rubber, for the purpose to presently appear.

To couple the hose the portion 17 of the member 11 is inserted within the socket 13, with the lugs 19 thereof passing through the channels 15 and beyond the inner edges of the ribs 14. The rounded end of the portion 17 is thus brought into yielding engagement with the gasket 21, said gasket being compressed between the portion 17 and the shoulder 20 and against the wall of the socket 13 and normally tending to urge the member 11 outwardly from the socket. The member 11 is then given a quarter turn in either direction to move the lugs 19 out of registration with the channels 15, said lugs sliding along the inner edges of the ribs 14 and being forced into the notches 16 by the expansion of the gasket. The coupling being now assembled, to uncouple the members, the portion 17 is forced inwardly to further compress the gasket and move the lugs 19 out of the notches 16, a quarter turn of said member bringing the lugs into registration with the channels and permitting of disconnection of said members.

From the foregoing it will be observed that there is provided a coupling of the character described which is simple in construction, inexpensive to manufacture and one which is fully capable of accomplishing its purpose in an efficient and reliable manner.

What is claimed is:

A hose coupling comprising a pair of tubular members, one of said members being provided with a cylindrical socket and a shoulder formed at the base of the socket, circumferentially spaced ribs formed in said socket, said ribs providing diametrically opposed channels between their mutually adjacent ends and having notches formed in their inner edges, a highly resilient gasket seated within the socket and presenting a substantially square shoulder opposite said ribs and bearing against the shoulder, the other of said members being provided with a cylindrical portion adapted for insertion within the socket and having its extremity rounded, diametrically opposite lugs formed on said portion and having curved outer surfaces which merge with the rounded extremity, said lugs being adapted to pass through said channel with the rounded end of said portion compressing the gasket radially from its opening between it and the shoulder to hold the outer ends of the lugs yieldably engaged in said notches to provide a tight joint between the members, said lugs upon rotation of the members in opposite directions serving to couple or uncouple the members under the expansive and contractive action of the gasket.

In testimony whereof, I affix my signature, in the presence of two witnesses.

HAROLD V. STYERS.

Witnesses:
RICHARD RYERSEN,
B. J. SUDWERTHY.